UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

NON-INFLAMMABLE VARNISH COMPOSITION.

1,094,830.  Specification of Letters Patent.  Patented Apr. 28, 1914.

Application filed January 2, 1912. Serial No. 668,942.

No Drawing.

*To all whom it may concern:*

Be it known that I, JONAS W. AYLSWORTH, a citizen of the United States, and a resident of East Orange, in the county of Essex, State of New Jersey, have invented a certain new and useful Non-Inflammable Varnish Composition, of which the following is a description.

My invention relates to a varnish giving a tough, hard, adhesive film of great mechanical strength compared to the varnish gums, and of non-inflammability or of greatly decreased inflammability when compared with celluloid.

The varnish composition above referred to, after the solvent has been dried out of the same, may be used as a comparatively non-inflammable substitute for celluloid which possesses most of the desirable properties of celluloid, such as plasticity, ease of working and toughness.

Accordingly, the object of my invention is the production of a composition having the properties referred to, and which properties will be more fully described hereinafter, the composition, when dissolved in a suitable amount of a suitable solvent to be hereinafter described, serving as a varnish composition, and when freed from the greater part of the solvent, serving as a plastic or moldable substance similar to celluloid but having certain advantages thereover.

The varnish composition is especially adapted for forming a varnish film on furniture and on metal, such for example as metal railway coaches, automobiles, chemical apparatus, food containers and tanks for various chemical operations. It is also well suited for forming the record bearing surface of duplicate sound records. The varnish comprises a solution of a cellulose ester of the acetic series, preferably acetyl cellulose, in a suitable solvent preferably acetylene tetra-chlorid, compounded with the solution of a fusible phenol resin in the same solvent. The phenol resin is preferably the fusible soluble condensation product of phenol and formaldehyde, described in my copending application Ser. No. 496,060, filed May 4, 1909, and in my Patent No. 1,029,737, dated June 18, 1912, and is preferably dehydrated by heating the same to a temperature of at least 400° F. under atmospheric pressure, or at a temperature of approximately 50° F. less in a vacuum. These substances may be compounded in all proportions and when the varnish is applied and the acetylene tetra-chlorid dried out, a film results which has the composite properties of both the phenol resin and the acetyl cellulose in approximate agreement with the relative proportions used. By the term "phenol resin" I mean to include the resins of the homologues of phenol, such as the cresols, cresol resin being even superior to phenol resin, for the purpose of my invention, because of its greater solubility in acetylene tetra-chlorid. The varnish solution thus produced may be applied easily and smoothly to the surface to be varnished, dries quickly and is non-inflammable.

An example of the composition is the following: 100 parts cresol gum, dehydrated, 100 parts acetyl cellulose, 1000 parts acetylene tetra-chlorid.

When a more flexible varnish film is desired, an oil or soft substance may be added in the proportion of from 10 to 30 per cent. of the weight of the combined solids in the varnish. Such a body is a halogen substitution product of a fatty acid, such as chlorinated stearic acid or derivatives of the halogenized fatty acids, such as the methyl, ethyl, propyl or amyl ester of a halogenized fatty acid, such as stearic, palmitic or myristic acid. Such substances are referred to in my Patent No. 962,877, June 28, 1910, celluloid composition. Various inert pigments and filling bodies may also be added to the composition if desired, when the latter is to be used as a paint, enamel or celluloid mass. Also, a small percentage of hexa-methylene-tetra-amin may advantageously be added to the composition in proportions up to approximately 5 per cent. of the weight of the phenol or cresol resin used. This is sometimes desirable, since it prevents the reddish coloration which is apt in the course of time to take place when phenolic resins are used, in which certain impurities are contained. This is also advantageous because if the film is subsequently subjected to heat treatment, the composition is rendered harder and less subject to change by temperature variations, this result being caused by reaction between the methylene radical $CH_2$ of the methylene amin and the phenol resin. When this reaction takes place, ammonia is evolved, which, however, with the proportion of hexa-methylene-tetra-amin indicated, and at the temperatures to which the film would be subjected in practice, would be retained in combination tenaciously within the mass. However, if desirable, a small proportion of a substance for combining or still more permanently fixing the ammonia, can be included in the solution. Such a substance may be either an organic acid anhydrid, such as phthalic or benzoic anhydrid, or the higher anhydrids of the acetic series of acids, or it may be one of the higher halogen substitution products of a phenol, such as tetra-chloro phenol. This substance combines with or fixes more permanently the ammonia at elevated temperature at which, if it were not used, ammonia would be evolved from the mass, as do all the organic acid anhydrids referred to, which combine with the ammonia to form acid amids.

Acetylene tetra-chlorid is especially valuable as a solvent for such compositions as those above described, for a number of reasons. It is absolutely water-free so that when the dehydrated phenol resin is used and the other elements are anhydrous, there is no water present in the composition. This is especially advantageous when the varnish film is to be used in electrical insulation. The phenol resin should contain no free formaldehyde, as is described in my application, Ser. No. 496,060, referred to. The acetylene tetra-chlorid is a good solvent for the acetyl cellulose and also for the phenol resin or cresol resin used and is a good solvent for the hexa-methylene-tetra-amin when the latter is used in the proportions indicated. Also, as is stated in my application Ser. No. 496,060, referred to, the phenol resin apparently acts as a solid solvent for acetyl cellulose and other cellulose esters. The acetylene tetra-chlorid is volatile at ordinary temperatures and at the same time its boiling point is sufficiently high so that any trace of it which may be left in the enamel film has no injurious action and does not cause bubbling if the film should be heated to the reaction temperature of the phenol resin and the hexa-methylene-tetra-amin, if the latter is used. Furthermore, the acetylene tetra-chlorid is non-inflammable and has no disagreeable odor. Acetylene tetra-chlorid is the only solvent of which I know which when used alone, is a solvent for all of the above described ingredients. Some other solvents, such as acetone, and chloroform, dissolve some of the ingredients, but not all. I may use a mixture of acetylene-tetra-chlorid, with other solvent, such as acetone and di-chloro-methane, with advantage in certain cases, as when a particularly rapid drying film is desired.

When the composition is to be used as a substitute for celluloid so large a proportion of solvent as was indicated in the case of the varnish is not necessary or desirable. The phenol or cresol resin and the hexa-methylene-tetra-amin together with the halogenized fatty acid or derivative thereof, if the last named two substances are used, are dissolved in the minimum amount of solvent consistent with the method of subsequent mixing and this solution is added to the cellulose acetate or other ester of cellulose used, which should be in finely divided state, and the whole is then mixed thoroughly in a heated mixing machine, the solvent then being dried out. If desired, the mass may be made sufficiently stiff by limiting the amount of the solvent, so that objects may be formed from the composition without a preliminary drying operation. If it is desired, as stated, one of the ammonia combining agents may also be incorporated with the mass if the hexa-methylene-tetra-amin is used. This last named substance is desirable in many cases to prevent coloration of the product, as stated, but it may be omitted when a colored or dark composition is to be formed. The halogenized fatty acid or derivative may advantageously be incorporated with the mass in proportions up to approximately 30 per cent. of the weight of the mass. Suitable fibrous or powdered organic or mineral fillers may also be incorporated with the mass when desired.

As examples of the substances to be mixed together, I may give the following:—200 parts cellulose acetate, 25 to 200 parts phenol or cresol resin dissolved in from 100 to 200 parts acetylene tetra-chlorid, 0 to 300 parts filler. 200 parts cellulose acetate, 25 to 200 parts phenol or cresol resin dissolved in 100 to 200 parts acetylene tetra-chlorid, 2 to 12 parts hexa-methylene-tetra-amin, 0 to 300 parts filler. 200 parts cellulose acetate, 25 to 200 parts phenol or cresol resin, 50 to 200 parts acetylene tetra-chlorid, 2 to 12 parts hexa-methylene-tetra-amin, 0 to 100 parts halogenized fatty acid or derivative.

Having now described my invention what I claim as new and desire to protect by Letters Patent is:—

1. A varnish composition comprising a solution of acetyl cellulose and a phenol resin in acetylene tetra-chlorid, substantially as described.

2. A varnish composition comprising a cellulose ester and a phenol resin dissolved in a water-free volatile solvent therefor, substantially as described.

3. A varnish composition comprising cresol resin and a cellulose ester dissolved in a water-free volatile solvent therefor, substantially as described.

4. A varnish composition comprising a dehydrated phenol resin and a cellulose ester dissolved in a water-free volatile solvent therefor, substantially as described.

5. A varnish composition comprising approximately 100 parts of a phenol resin, and 100 parts of acetyl cellulose, dissolved in 1000 parts of acetylene tetra-chlorid, substantially as described.

6. A varnish composition comprising a cellulose ester, a phenol resin, and hexa-methylene-tetra-amin in small amount, all dissolved in a suitable solvent therefor, substantially as described.

7. A new composition of matter comprising a cellulose ester of the acetic series, a fusible phenol resin, acetylene-tetra-chlorid and hexa-methylene-tetra-amin, thoroughly mixed, substantially as described.

8. A varnish composition comprising a cellulose ester, a phenol resin, a small proportion of hexa-methylene-tetra-amin and an ammonia-combining agent all dissolved in acetylene-tetra-chlorid, substantially as described.

This specification signed and witnessed this 28th day of December 1911.

JONAS W. AYLSWORTH.

Witnesses:
  DYER SMITH,
  HENRY SHELDON.